United States Patent [19]

Dorsch

[11] Patent Number: 4,560,106
[45] Date of Patent: Dec. 24, 1985

[54] HEATING AND/OR AIR-CONDITIONING INSTALLATION FOR MOTOR VEHICLES

[75] Inventor: Werner Dorsch, Gerlinden, Fed. Rep. of Germany

[73] Assignee: Bayerische Motoren Werke Aktiengesellschaft, Fed. Rep. of Germany

[21] Appl. No.: 625,978

[22] Filed: Jun. 29, 1984

[30] Foreign Application Priority Data

Jun. 30, 1983 [DE] Fed. Rep. of Germany ....... 3323568

[51] Int. Cl.$^4$ ............................................. G05D 23/00
[52] U.S. Cl. .................................. 236/91 E; 62/213; 165/28; 374/110
[58] Field of Search ............. 62/213; 236/91 E, 91 G, 236/91 R; 165/43, 28; 374/110

[56] References Cited

U.S. PATENT DOCUMENTS 2,155,371 4/1939 Anderegg et al. .
4,375,754 3/1983 Okura ................................. 165/43 X Primary Examiner—William E. Wayner
Attorney, Agent, or Firm—Craig & Burns

[57] ABSTRACT

In a heating and/or air-conditioning system for motor vehicles with a temperature sensor in the head space and a temperature sensor in the leg space as component parts of an interior space temperature regulating installation, the temperature sensors are so connected to the regulating installation in dependence on the outside temperature that at low, respectively, high outside temperature, the influence of the leg space, respectively, of the head space temperature sensor on the regulating installation dominates.

10 Claims, 2 Drawing Figures

FIG.1
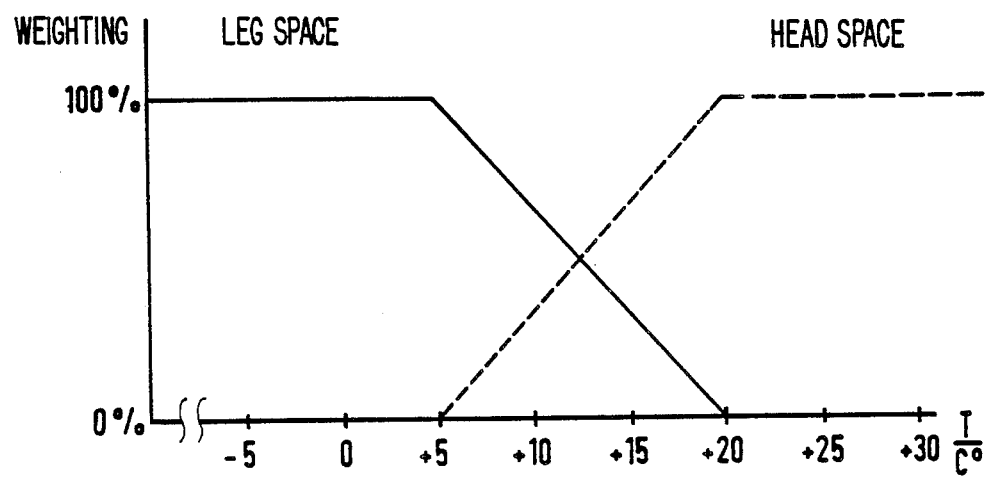
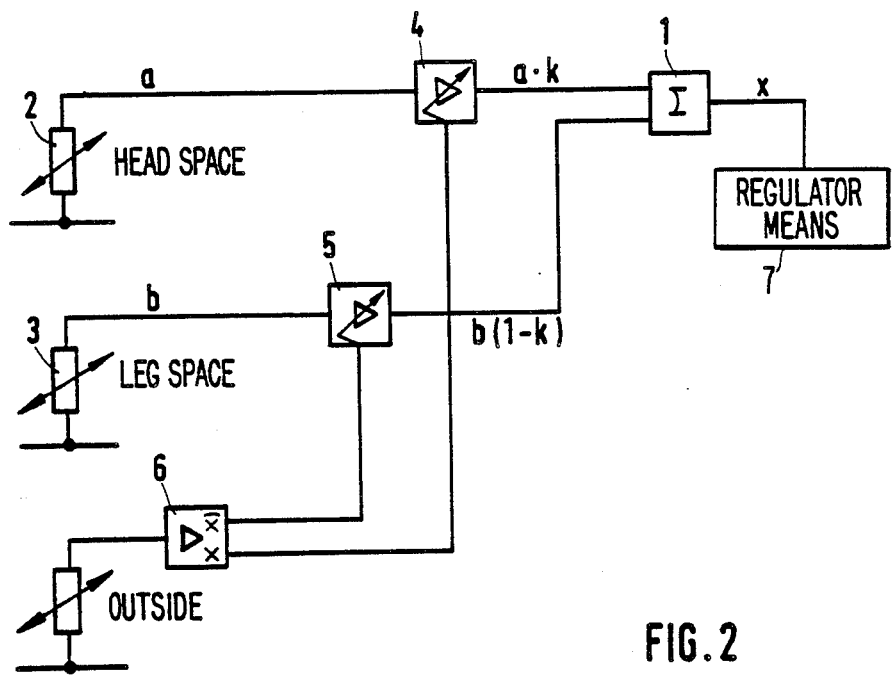
FIG.2

HEATING AND/OR AIR-CONDITIONING INSTALLATION FOR MOTOR VEHICLES

The present invention relates to heating and/or air-conditioning installation for motor vehicles, with a temperature sensor in the head space and a temperature sensor in the leg space as component parts of an interior temperature-regulating system.

It is known from *Automotive Engineering*, April, 1975, pages 10 et seq. to connect these two temperature sensors together with a solar sensor and an outside temperature sensor to the regulating installation. However, with respect to the particular realization of this arrangement or of a circuit appropriate therefor, the existing indications only suggest that the output signals of these sensors are to be processed electronically. However, without special measures, this is possible only with considerable expenditures.

The present invention is now concerned with the task to provide a heating and/or air-conditioning installation of the aforementioned type which adjusts the temperature of the interior space to the desired required value with low expenditures as regards the number of sensors and also as regards the processing of the sensor signals.

The underlying problems are solved according to the present invention in that the temperature sensors are connected with the regulating installation as a function of the temperature of the outside in such a manner that at low outside temperatures; the leg sensor temperature is compared to the outside temperature and controls; while at high outside temperatures, the head sensor temperature is compared to the outside temperature and controls; and at intermediate outside temperatures, the control is effected by both leg and head sensors compared to outside temperature with the influence of the leg sensor being reduced and the head sensor being increased as the intermediate outside temperature moves from the said low temperature to the said high temperature and wherein the influence of the leg sensor is increased and the head sensor is reduced when the intermediate outside temperature moves from said high to said low temperature.

The present invention is predicated on various considerations. Thus, on the one hand, in case of extreme outside temperatures, one of the two temperature sensors is practically without significance. This involves the temperature sensor in the head space with low outside temperatures and the temperature sensor in the leg space with high outside temperatures. The reason therefor are the temperatures which automatically result during such extreme outside temperatures in the respectively other areas of the interior space, i.e., without heating and/or air-conditioning system, and which are similar to the outside temperatures and differ considerably from the desired interior space temperature. Added thereto is the fact that as a result of the temperature-conditioned behavior of the air flowing into the interior space, these temperature sensors come in contact with the air changed disproportionately strongly in temperature. Thus, the cooled-off air (during air conditioning operation) drops into the leg space whereas the heated air (during heating operation) rises into the head space. In contrast thereto, the respectively remaining temperature sensors provide under these extreme conditions a relatively good indication concerning the temperature of the interior space.

On the other hand, the use of an outside temperature sensor is not necessary. This is so because a signal dependent on the outside temperature can also be obtained in a different manner. Thus, for example, a temperature sensor for an operating fluid or the cooling fluid which is already present in the motor vehicle, can also supply an indication concerning the outside temperature after a longer standstill of the motor vehicle and at the beginning of a drive. Furthermore, the outside temperature can also be determined from the temperature-change behavior of the at least partially heated air fed to the interior space.

The realization of the present invention is possible in various ways. One embodiment which is particularly simple from a circuit point of view, consists in engaging or connecting-in alone the head space temperature sensor during air-conditioning operation, i.e., at high outside temperatures, and in engaging or connecting-in alone the leg space temperature sensor during heating operation, i.e., at low outside temperatures. It is thereby possible in a particularly simple manner from a circuit point of view to switch-over between the temperature sensors at a predetermined temperature. In contrast thereto, the effectiveness of the interior space temperature regulating system can be further improved if the two sensors are cut-in or engaged in a stepped or continuously varying function of the outside temperature between their fully effective or fully operable condition and their fully ineffective or inoperable condition. The increasing engagement or switching-in of the one sensor takes place "at the expense" of the other sensor which is increasingly cut out in a corresponding manner. This complementary switching of the two sensors has the same effect as a single interior temperature sensor which is movable in its height inside the interior space of the vehicle corresponding to the outside temperature. For each outside temperature, this temperature sensor is then "seated" at the proper height.

These and other objects, features and advantages of the present invention will become more apparent from the following discription when taken in connection with the accompanying drawing which shows, for purposes of illustration only, one embodiment in accordance with the present invention, and wherein:

FIG. 1 is a diagram in which sensor weighting is plotted as a function of temperature; and FIG. 2 is a schematic circuit diagram of a regulating system in accordance with the present invention.

The diagram of FIG. 1 illustrates the influence of two temperature sensors in the interior space of a motor vehicle on an interior space temperature-regulating system. The two temperature sensors are located in the head space, and in the leg space of the motor vehicle. At low outside temperatures below +5° C., the temperature sensor in the leg space alone is to be effective and at relatively high outside temperature of above 20° C., the head space temperature sensor alone is to be effective. In the transition range, i.e., in this case between +5° C. and +20° C., the temperature sensor in the leg space is to be continuously cut-out or faded-out and the temperature sensor in the head space is to be continuously cut-in or faded-in.

This operation is indicated in FIG. 1 by representation of the weighting or valuation of the output signal of the two temperature sensors as a function of outside temperature. The weighting or valuation takes place for both temperature sensors between 0% and 100%. For the leg space temperature sensor it possesses a value of 100% for temperatures smaller than or equal to +5° C., in order to decrease thereafter to a value of zero within the transition range. For temperatures about 20° C., the weighting then remains at this zero value. The weighting of the leg space temperature sensor takes place in a manner complementary thereto. It is equal to the value zero for temperatures below 5° C. then rises continuously to 100% at 20° C. and remains at this value above 20° C.

This weighting can be realized from a circuit point of view as schematically illustrated in FIG. 2. The output signal of a summing or adding element 1 is applied to a regulator means 7 for an interior space temperature regulating installation (not shown) as presently used in series production, for example, in connection with a single interior temperature sensor. The output signals of temperature sensor 2 and 3 are applied to the adding element 1 by way of an amplifier 4 and 5, respectively. The temperature sensors 2 and 3 are located in the head space and in the leg space of the motor vehicle, respectively. The amplifiers 4 and 5 are controlled in a complementary manner as a function of the outside temperature. A further amplifier 6 serves for this purpose whose outputs X and $\overline{X}$ determine the amplification factor of the amplifiers 4 and 5; the output signal of an outside temperature sensor being connected to the input of the amplifier 6. In lieu of this outside temperature sensor, any other reference magnitude representing outside temperature may be used to control the amplifier 6.

The output signal a of the temperature sensor 2 receives within the transition range (FIG. 1) a weighting factor k by means of the amplifier 4 and reaches the adding element 1 as signal a·k. The weighting factor thereby lies between the values of 0 and 1. The output signal b of the temperature sensor 3 is weighted complementary thereto by the amplifier 5 and reaches the adding element 1 as signal b·(1−k). The output signal x formed thereat then satisfies the relationship a·k+b·(1−k). Outside of the transition range, only one of the two temperature sensors is effectively cut-in or rendered operable. This can be achieved in a simple manner by a circuit (not illustrate) effecting a disconnection of the output signals a and b in the temperature range up to 5° C. and above 20° C., respectively, in lieu of the signal x applied to the control installation.

It becomes possible in this mannerr to supply for each outside temperature to the interior space temperature regulating system a precise indication concerning the temperature in the interior space. As a result thereof, the manner of operation of the regulating system can be optimized. By avoiding operating conditions of the heating and/or air-conditioning system, which are not matched to the actual requirements of the vehicle passengers, the comfort in the interior space can be increased.

While I have shown and described only one embodiment in accordance with the present invention, it is understood that the same is not limited thereto but is susceptible of numerous changes and modifications as known to those skilled in the art, and I therefore do not wish to be limited to the details shown and described herein but intend to cover all such changes and modifications as are encompassed by the scope of the appended claims.

I claim:

1. A heating and/or air-conditioning installation for motor vehicles, comprising an interior space-temperature-regulating system including interior space-temperature regulating means, temperature sensor means in the hand space and temperature sensor means in the leg space, and means operatively connecting the temperature sensor means with the regulating means as a function of the outside temperature in such a manner that at lower outside temperatures the influence of the leg space temperature sensor means dominates the influence of the head space temperature sensor means on the regulating means.

2. An installation according to claim 1, wherein at low outside temperatures the leg space temperature sensor means alone is operable and at high outside temperatures, the head space temperature sensor means alone is operable.

3. An installation according to claim 2, wherein the two temperature sensor means are rendered operable in a complementary manner.

4. An installation according to claim 3, wherein within a transition range of the outside temperature, the output signals of the two temperature sensor means are weighted in a complementary manner and are fed to the regulating means by way of an adding element.

5. An installation according to claim 1, wherein the two temperature sensor means are rendered operable in a complementary manner.

6. An installation according to claim 5, wherein within a transition range of the outside temperature, the output signals of the two temperature sensor means are weighted in a complementary manner and are fed to the regulating means by way of an adding element.

7. An installation according to claim 1, wherein the two temperature sensor means are rendered operable always in a complementary manner.

8. An installation according to claim 1, wherein the output signal of each temperature sensor means is fed to the regulating means by way of its own amplifier, and control means for controlling the gain of the respective amplifiers in a complementary manner at least within a predetermined range of ambient temperature.

9. An installation according to claim 8, wherein said control means includes an ambient temperature sensor means whose output signal is applied to the input of an amplifier producing complementary output signals used to control the gain of the two first-mentioned amplifiers.

10. An installation according to claim 9, wherein the outputs of the two first-mentioned amplifiers are fed to a common adding element.

* * * * *